United States Patent [19]

Effenberger

[11] Patent Number: 4,633,897
[45] Date of Patent: Jan. 6, 1987

[54] ACTUATOR MOUNT FOR VALVES

[76] Inventor: Leo T. Effenberger, 7161 Angora Loop S., El Paso, Tex. 79934

[21] Appl. No.: 848,391

[22] Filed: Apr. 4, 1986

[51] Int. Cl.[4] ............................................. F16K 43/00
[52] U.S. Cl. ...................................... 137/315; 251/58; 251/292; 251/291
[58] Field of Search .................. 137/315; 251/58, 229, 251/291, 292, 304, 306, 308; 248/674

[56] References Cited

U.S. PATENT DOCUMENTS

| 3,034,371 | 5/1962 | Cantalupo et al. | 251/291 |
| 3,183,926 | 5/1965 | Boudot | 137/315 |
| 3,648,718 | 3/1972 | Curran | 137/315 |
| 3,929,058 | 12/1975 | Smith | 251/58 |
| 4,231,389 | 11/1980 | Still et al. | 251/291 |
| 4,270,849 | 6/1981 | Kalbfleisch | 251/292 |
| 4,313,595 | 2/1982 | Markley et al. | 251/292 |

Primary Examiner—George L. Walton
Attorney, Agent, or Firm—Price, Heneveld, Cooper DeWitt & Litton

[57] ABSTRACT

A valve actuator is provided which clamps to the axially extending assembly bolts of the valve or to ribs on the valve body simulating the bolts. The actuator has a support frame with ears which seat over a pair of the bolts or ribs and by means of stops formed by recesses in the ears seat the support frame on the bolts or ribs and threaded anchor members, when tightened, cause the ears to tightly clamp to the bolts or ribs, preventing either lateral or axial movement with respect to the valve body.

10 Claims, 6 Drawing Figures

ACTUATOR MOUNT FOR VALVES

FIELD OF THE INVENTION

This invention relates to valves for fluids and more particularly to a means for securing a valve actuator to the valve body.

BACKGROUND OF THE INVENTION

Most valves, except the small sizes normally used in individual domestic water and gas supply installations, require some type of actuator. The use of an actuator may be necessary because the valve must be actuated by remote means or the force required to actuate the valve makes manual actuation very difficult or impossible. Also, the valve may be so located that access for manual operation is either difficult or not available.

Irrespective of the reason for use of an actuator, it is necessary to secure the actuator to the valve so that the torque generated by the actuator does not cause displacement between the actuator and the valve body. It is also necessary to prevent separation occurring between the valve and actuator. This is important because the torque transmitting linkage between the actuator and the valve must be of a type suitable only for transmitting torsional loads in order to facilitate mounting of the actuator on the valve. Thus, the mount itself must transmit the counterforces and positively prevent any tendency to separate as a result of vibration and shock resulting from the stopping and starting of the actuator. This requires the actuator to be firmly attached to the valve body by means adequate to positively transmit the torsional forces generated by the actuator. Although various actuator mounts have been developed, all of them have required the valve body to be provided with special lugs, flanges or bosses for mounting fasteners such as bolts or studs. Thus, the valve body has to be specifically designed to mount the actuator support. The result was to require each actuator mount to be custom designed for the particular make, size and design of valve with the attendant design and manufacturing costs and limitations on availability. Also a broken lug or flange or a damaged thread on either the support or the valve body often resulted in costly and frustrating delays in restoring the valve to service.

BRIEF DESCRIPTION OF THE INVENTION

The invention provides a means of mounting actuators to valve bodies which require no special valve body design and drilling or tapping of the valve body or of the actuator mount. Further, it utilizes simple, inexpensive components easily adaptable to valve bodies of various sizes because instead of bolting, the mount is clamped to the valve body, thus, freeing the mount from having to be customized to the particular valve design. This simplifies the design of both the actuator mount and the valve body. It also simplifies installation and removal. It materially reduces manufacturing cost and the cost of installation, service and replacement in the field.

DESCRIPTION OF THE PREFERRED EMBODIMENT

Figure 1:
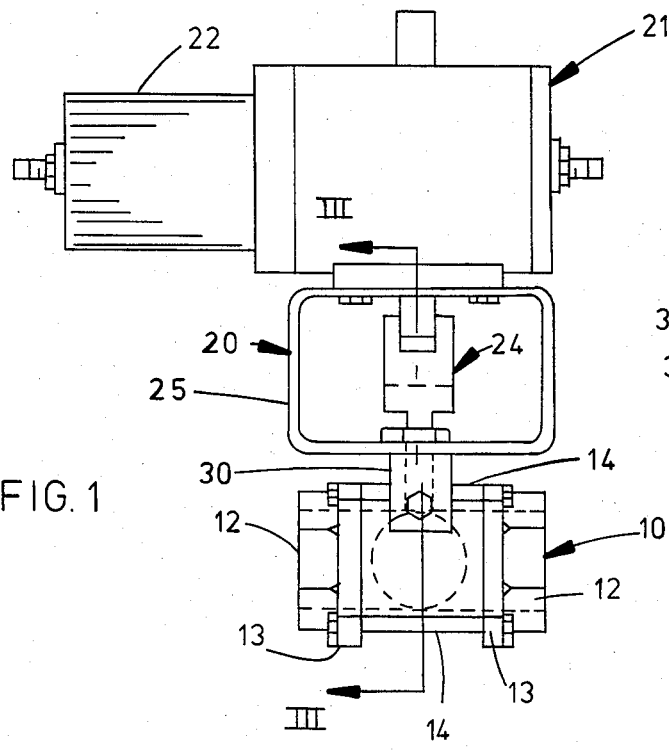
FIG. 1 is a side elevation view of a valve actuator mount incorporating my invention.
Figure 3:
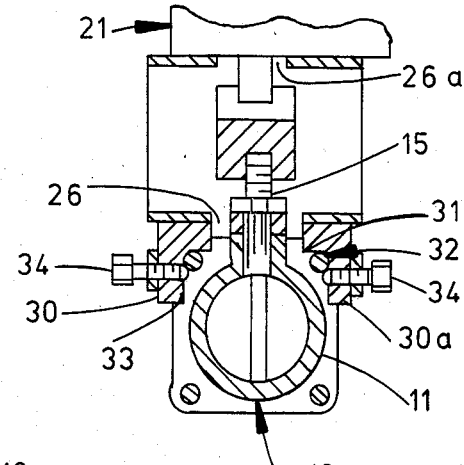
FIG. 3 is a sectional elevation view taken along the plane III—III of FIG. 1.
Figure 4:
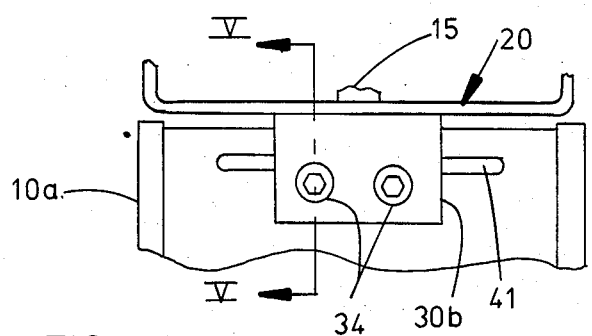
FIG. 4 is a fragmentary side elevation view of a modification of the invention.
Figure 2:
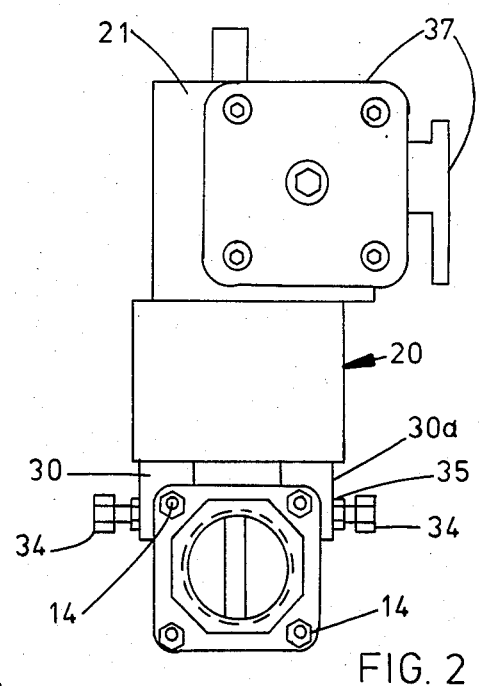
FIG. 2 is an end elevation view of the valve and actuator mount illustrated in FIG. 1.

Referring to FIG. 1, the numeral 10 identifies a valve body having a main body portion 11 and a pair of end caps or portions 12. The end caps each have a radially outwardly extending flange providing four equally spaced bosses 13. The bosses of the two end caps are connected by four assembly bolts 14 which extend from end cap to end cap axially and exteriorly of the main body 12. These bolts are preferably equally spaced about the circumference of the valve body, it being important only to this invention that the bolts of the pair between which the valve stem 15 is positioned are so located as to be equally spaced from the valve stem as illustrated in FIG. 4. Located within the valve body 11 is a valve member, not illustrated, operatively connected to the valve stem. The valve member may be of any suitable type such as ball or butterfly so long as it is a type which is shifted from open to closed position by rotation of the valve stem.

Everything which has been described up to this point is conventional in the valve art and will be immediately recognized and understood by those acquainted with the design, installation and service of valves for fluids.

Secured to the valve body is an actuator mount 20 which, in turn, supports an actuator 21. The actuator 21 can be any one of a wide variety of designs. The particular actuator illustrated is designed to be power operated pneumatically or hydraulically by the mechanism contained in the housing 22. The actuator, however, could very well be electrically powered. The actuator 21 is connected to the valve stem 15 by a suitable linkage 24. The actuator 21 and linkage 24 are conventional and will be recognized and understood by those acquainted with the design, installation and servicing of valves for fluids.

The actuator mount 20 has a frame 25, which, in this case, is of rectangular tubular construction and can be fabricated simply by severing a section of suitable length from a conventional rectangular steel tube. Steel is a preferred material because of its strength for resisting the torsional twisting loads applied by the actuator 21. The tube, preferably at its center, has enlarged access openings 26 and 26a to accommodate the valve stem 15 and valve stem linkage 24. The openings can be substantially oversize to accommodate valve stems and linkages of various sizes and designs since the frame 25 is never attached to and does not support the valve stem and linkage.

Secured to the bottom face of the lower flange of the frame 25 and depending therefrom are a pair of ears 30. The ears are rigidly attached to the frame by suitable means such as screws or preferably welding. The inner faces of the ears have recesses 31 opening through the lower ends of the ears. The upper end of each recess 31 terminates in an inwardly extending wall or ledge which forms a stop 32 spaced from the lower face of the frame 25. The recesses form inwardly facing walls 33 spaced apart such that the bolts 14 can be closely but slidably received between them. The lateral depth of the recesses is preferably equal to the diameter of the bolts 14 to provide a positive seat by which the ears can rest on and be supported by the two bolts between which the valve stem is located. With the ears so seated, the frame 25 is supported a short distance above the top of the valve body (FIG. 1).

Threadedly mounted through the lower portion of each of the ears is an anchor member 34 which can be a screw or bolt. The anchor members are so located that they firmly engage against the lower faces of the bolts 14 and draw the stops 32 against the tops of the bolts, thus, positively clamping the actuator mount 20 to the bolts 14. Once the anchor members 34 have been tightened their position can be secured by a lock element such as the nut 35. The ears 30 are designed with sufficient width to provide the necessary bearing to prevent any rocking of the actuator mount in the axial direction of the valve body.

Figure 6:
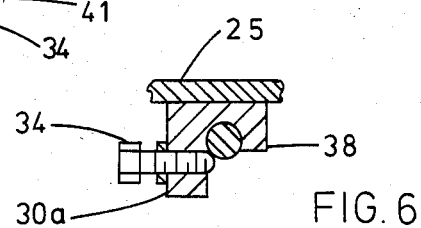
FIG. 6 is a fragmentary sectional view illustrating a modified support ear for the actuator mount.

FIG. 6 illustrates a modified construction for the ears in which the ear 30a has an inner lip 38 seating over the inner face of the bolt 14. This construction is used with bigger valves and valve actuators to better resist the torque generated by the actuator.

In designing the actuator mount, the frame 25 should be of a size to provide adequate tool accessibility for installing, adjusting and servicing the valve stem linkage 24. It will be recognized that the valve stem linkage can be largely preassembled and installed on either the valve stem or the actuator prior to securing the actuator and the actuator mount on the valve. For service purposes, it is only necessary to release the two lock nuts 35 and anchor members 34 to permit the entire assembly to be removed to a convenient location such as a workbench to perform the actual service work. If the valve has to be replaced, any replacement valve of the same type can be used without the necessity for ascertaining whether it has the particular flange, lug and bolt pattern configuration to accommodate the existing actuator mount.

The invention also facilitates alignment between the actuator and the valve because the engagement between the ears 30 and the bolts 14 provide positive lateral alignment and movement of the entire actuator assembly along the bolts 14 can be made quickly and easily. A limited degree of lateral adjustment can be made possible through the use of oversize holes for the bolts securing the housing 22 to the mount 20. Normally, the actuator housing is equipped with mounting plates 37, 37a. These provide mounting means for the piping manifold for the air lines supplying the actuator 21.

The actuator mount 20 can easily be made to accommodate a wide range of conventional valve sizes. To do this, the manufacturer only has to provide jigs to space the ears to seat over the standard bolt 14 spacing for each valve size. These jigs are simple, relatively inexpensive to make and easy to use. If the spacing becomes too great for the width of the tubular frame 25, either a larger frame can be utilized or a spacer bar can be utilized to permit the ears 30 to be spaced further apart than the width of the frame 25 would otherwise permit.

In the case of larger valves, a simple anchor member 34 may not be sufficient to positively secure the actuator mount against the high torque loads necessary to operate the valve. In this case, the width of the ears 30a can be increased and two anchor members 34 used with each ear (FIG. 4). The principle of construction and operation, however, remain the same.

Figure 5:
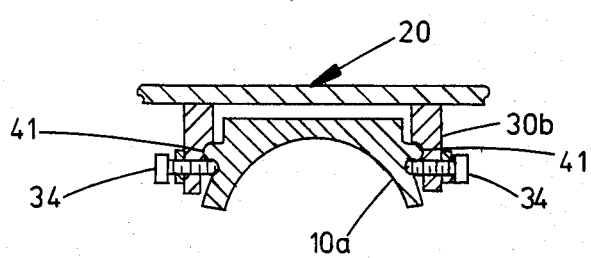
FIG. 5 is a fragmentary sectional elevation view taken along the plane V—V of FIG. 4.

FIGS. 4 and 5 also illustrate a further modification to adapt this invention to valve bodies not utilizing the assembly bolts 14. In this case, the valve body 11 can be cast with a ridge 41 projecting from each side in the same location as would have been occupied by the bolts 14, had they been used. The ridges are preferably somewhat thicker than the bolts to compensate for the reduced strength of brass or bronze as compared to the steel shanks of the bolts. The ridges 41 can extend the full length of the valve body or only a portion of the length as shown in FIG. 4. If the ridges are made thicker than the bolts, the spacing between the stop 32 and the anchor member 34 would have to be adjusted to accommodate. This, however, would require only two models rather than the numerous models required by presently available actuator mounts. Then this could be overcome by securing the ears by screws rather than welding, permitting the mount to be modified as needed at the point of use.

Having described a preferred embodiment of my invention and several modifications thereof, it will be recognized that other modifications can be made without departing from the principles of the invention. Such modifications are to be included in the hereinafter appended claims unless the claims, by their language, expressly state otherwise.

I claim:

1. Means for securing an actuator to a valve, the valve having a body including a plurality of bolts arranged exteriorly of and in spaced relationship around the valve body and extending lengthwise thereof for holding the valve body together, said means comprising: a frame element for supporting the actuator, said frame element having a flange adapted to extend generally parallel to one side face of the valve body and having a pair of ears mounted thereon and spaced apart to seat on at least two of said bolts and against the outer faces thereof for supporting said frame element; said ears each having a step forming a stop surface facing away from said flange, said stops facing each other and seating on said bolts for limiting movement of said ears toward said valve body and stabilizing said ears and frame against rocking motion lengthwise of said bolts; anchor means on each of said ears movable for engaging the surface of said bolts opposite from said stops for locking said ears and frame element to said valve body.

2. Means for securing an actuator to a valve of the type having a body and a valve stem projecting through one side of the valve body and including a pair of elongated rod-like members positioned exteriorly of the valve body one on each side of the valve stem and extending lengthwise of the valve body for holding the valve body together, said means comprising: an actuator support frame element having a flange, a pair of ears mounted on and extending from said flange and spaced apart to seat over and against the outer faces of the rod-like members for supporting said frame element, said ears each having a stop surface facing away from said flange, said stop surfaces extending toward each other and spaced apart to seat on said rod-like members, adjustable anchor means, one on each of said ears spaced from said stop surfaces a distance to permit said anchor means to movable engage the rod-like members on the face thereof opposite from the stop surfaces for trapping said rod-like members between said anchor means and stop surfaces for stabilizing said support frame element against rocking motion.

3. Means for supporting an actuator on a valve as described in claim 2 wherein said anchor means are screws.

4. Means for supporting an actuator on a valve as described in claim 3 wherein said frame element has a pair of spaced parallel flanges, the second of said flanges being a seat and anchor means for a actuator.

5. Means for supporting an actuator on a valve as described in claim 4 wherein said frame element is tubular and of rectangular cross section and having open ends extending perpendicular to the longitudinal axis of the valve, the second of said flanges being an actuator seat; aligned openings in both of said flanges to receive and provide a passage for means for connecting the actuator to said stem.

6. Means for supporting an actuator on a valve as described in claim 3 wherein said valve body includes a main portion and a pair of end portions, said rod-like members being the bolts securing said end portions to said main portion.

7. In combination, a valve having a valve body and support means for supporting a valve actuator on said valve body, said valve body having a valve stem projecting through one side thereof; said valve body having a pair of rigid stationary members positioned exteriorly thereof, one on each side of the valve stem and extending laterally and lengthwise of the valve body forming laterally extending wings for said body; said support means including: a frame element having a bottom flange extending across said valve body normal to said wings, a pair of ears mounted on and extending from said flange and each having a socket means, said wings being spaced apart to seat within said socket means, said socket means each having a stop surface a portion of which faces away from said flange, said stop surfaces each having portions extending toward each other and spaced apart to seat on said wings, adjustable anchor means, one on each of said ears spaced from said stop surfaces a distance such that said anchor means movable seat against the surface of said wings for clamping said ears and said frame element to said valve body.

8. The combination described in claim 7 wherein said ears extend lengthwise of said wings a distance sufficient to prevent any rocking motion of said frame element lengthwise of said rod-like members.

9. The combination described in claim 8 wherein said anchor means are screws threadedly engaging said ears.

10. The combination described in claim 9 wherein at least a pair of said anchor means are mounted on each ear with the anchor means of each pair spaced lengthwise of said wings.

* * * * *